(12) United States Patent
Kawano et al.

(10) Patent No.: US 7,982,456 B2
(45) Date of Patent: Jul. 19, 2011

(54) MAGNETIC DETECTION APPARATUS

(75) Inventors: Yuji Kawano, Chiyoda-ku (JP); Hiroshi Kobayashi, Chiyoda-ku (JP); Yoshinori Tatenuma, Chiyoda-ku (JP); Masahiro Yokotani, Chiyoda-ku (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 423 days.

(21) Appl. No.: 12/277,691

(22) Filed: Nov. 25, 2008

(65) Prior Publication Data
US 2009/0302833 A1   Dec. 10, 2009

(30) Foreign Application Priority Data

Jun. 9, 2008  (JP) .................................. 2008-150562

(51) Int. Cl.
 *G01B 7/30* (2006.01)
(52) U.S. Cl. ................................................. 324/207.25
(58) Field of Classification Search ............... 324/207.2, 324/207.25, 207.11
See application file for complete search history.

(56) References Cited

U.S. PATENT DOCUMENTS

| 5,486,759 A * | 1/1996 | Seiler et al. ................. 324/207.2 |
| 5,500,585 A | 3/1996 | Aab |
| 6,498,474 B1 * | 12/2002 | Turner .......................... 324/165 |

FOREIGN PATENT DOCUMENTS

| DE | 43 08 031 A1 | 4/1994 |
| JP | 2002-090181 | 3/2002 |

* cited by examiner

*Primary Examiner* — Ha Tran T Nguyen
*Assistant Examiner* — Tung X Nguyen
(74) *Attorney, Agent, or Firm* — Sughrue Mion, PLLC

(57) ABSTRACT

In a magnetic detection apparatus, a magnetic detection sensor generates a sensor output signal whose high level and low level have different potentials in accordance with the moving direction of a magnetic moving object, and a computer unit includes three comparator circuits and detects the output signal of the magnetic detection sensor with three levels of comparison threshold values, so that the moving direction of the magnetic moving object can be detected accurately without any delay.

6 Claims, 15 Drawing Sheets

MAGNETIC DETECTION APPARATUS

BACKGROUND OF THE INVENTION

1. Field of the Invention

The present invention relates to a magnetic detection apparatus which detects a magnetic field intensity based on a magnetic moving object, whereby the rotation number or rotation angle of a rotating object, for example, can be detected. More particularly, it relates to a magnetic detection apparatus which can detect the moving direction of a magnetic moving object.

2. Description of the Related Art

In a magnetic detection apparatus which detects a magnetic field intensity based on a magnetic moving object, a scheme for detecting the moving direction of the magnetic moving object embraces several related-art techniques, depending upon a signal which a magnetic detection sensor outputs, and a method by which a computer unit processes the signal. In a case where the sensor output signal is a digital signal (rectangular wave), the detection of the moving direction of the magnetic moving object can be broadly classified into a scheme which time-modulates the sensor output signal, and a scheme which potential-modulates the sensor output signal. In the scheme which time-modulates the sensor output signal, the output timing (time) of the magnetic detection sensor differs in accordance with the moving direction of the magnetic moving object. By way of example, the time interval of the signal is denoted by a when the moving direction is a forward direction, and the time interval of the signal is denoted by b ($\neq$a) when the moving direction is a reverse direction. Then, the moving direction can be detected in such a way that the computer unit measures the time interval of the sensor output signal.

With this scheme, in a case where the moving direction has changed during the time intervals a or b, the detection of the moving direction delays in principle. On the other hand, in the scheme which potential-modulates the sensor output signal, the signal potential (high level or low level) of the magnetic detection sensor differs in accordance with the moving direction of the magnetic moving object. By way of example, the low level of the signal at the time when the moving direction is a forward direction is denoted by S[low-1], and the low level of the signal at the time when the moving direction is a reverse direction is denoted by S[low-2] ($\neq$S[low-1]). Then, the moving direction can be detected in such a way that the computer unit measures the potential of the sensor output signal. (Refer to, for example, Patent Document 1 being JP-A-2002-90181.)

The present invention belongs to the scheme which potential-modulates the sensor output signal. More specifically, as disclosed in Patent Document 1, the scheme includes a magnet which generates a bias magnetic field, and a magnetic detection sensor in which first and second magnetoresistive elements opposed to a magnetic moving object and juxtaposed in the moving direction thereof, and the output circuits of the respective elements are built, wherein a magnetic field change corresponding to the movement of the magnetic moving object is detected by then, and the moving direction is also detected by setting at least either of the high level and low level of an output signal at different potentials in accordance with the moving direction.

In the related-art technique stated in Patent Document 1, however, a method for processing the sensor signal is not optimal in the detection of the magnetic moving object, and delays occur in some cases. The detection delays are apprehended to cumulate in the repeated operations of a forward direction and a reverse direction in the moving direction, and the related-art technique is not suited to a use in which a movement position needs to be accurately detected by the detection of the moving direction.

As the application field of the magnetic detection apparatus, there is, for example, an on-vehicle rotation detection apparatus which detects a rotation number or a rotation angle in a vehicle so as to control an engine or a transmission. In general, the on-vehicle rotation detection apparatus is subject to a severe mounting environment, and a rotating direction is a forward rotation in most cases. Therefore, a position signal especially during the forward rotation needs to have not only a controllability, but also a noise immunity and robustnesses for a temperature change as correspond to a wide range of detection conditions (the rotation number, etc.).

In actuality, filters are often incorporated into, for example, the output of the magnetic detection sensor and the input of the computer unit as noise countermeasures. Therefore, a signal waveform becomes dull in the rise and fall of the rectangular wave, to pose the problem that the rectangular wave cannot sufficiently rise or sufficiently fall in a high rotation mode. In this case, the amplitude of the sensor output signal in the forward rotation mode should desirably be enlarged beforehand. Also from the viewpoint of the noise immunity, it is important that the amplitude of the sensor output signal in the forward rotation mode is made sufficiently large, thereby to ensure an allowance degree at which the hysteresis of a comparison threshold value signal in the comparator circuit of the computer unit can be set large. That is, in the use of the on-vehicle rotation detection apparatus or the like, the condition for avoiding the risk in practical use exists for the signal in the forward rotation mode.

SUMMARY OF THE INVENTION

The present invention has for its object to provide a magnetic detection apparatus which does not cause a detection delay in any case in the detection of the moving direction of a magnetic moving object, and which can accurately detect the moving direction of the magnetic moving object.

Another object of the invention is to provide a magnetic detection apparatus in which a detectability for the moving direction of a magnetic moving object and the usability and reliability of signals corresponding to a forward moving direction are compatible in a field of use where the mounting environment of the apparatus is inferior and where the moving direction of the magnetic moving object is mostly the forward direction, and which is excellent in practicability.

A magnetic detection apparatus according to the invention includes a magnetic detection sensor which includes a magnetoelectric transducer for detecting a magnetic field intensity, and a signal processing circuit for processing an output signal of the magnetoelectric transducer so as to output a signal of rectangular wave, and which detects a movement position and a moving direction of a magnetic moving object that gives a change to a magnetic field applied to the magnetoelectric transducer; and a computer unit which processes an output signal of the magnetic detection sensor so as to detect the movement position and moving direction of the magnetic moving object. Here, the magnetic detection sensor generates the output signal whose high level and low level have different potentials in accordance with the moving direction of the magnetic moving object. Besides, the computer unit includes three comparator circuits and detects the output signal of the magnetic detection sensor with three levels of comparison threshold values.

According to the invention, the movement position and moving direction of the magnetic moving object can be detected, and especially any delay is not caused in the detection of the moving direction, so that the accurate detection of the movement position is possible. Moreover, a wide range of detection conditions are coped with when the moving direction is a forward direction, and simultaneously, a high noise immunity can be realized.

The foregoing and other objects, features, aspects, and advantages of the present invention will become more apparent from the following detailed description of the invention when taken in conjunction with the accompanying drawings.

DESCRIPTION OF THE PREFERRED EMBODIMENTS

Embodiment 1

Figure 1A:
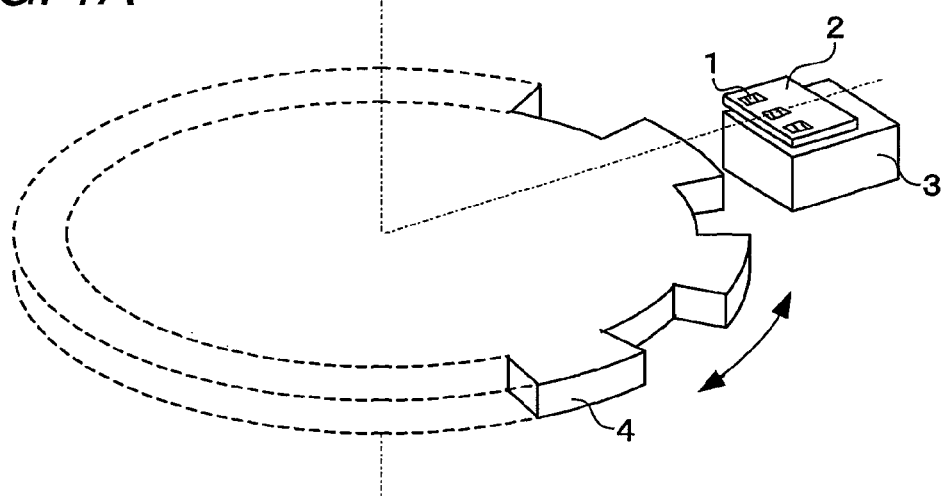
FIGS. 1A and 1B are a perspective view and a front view showing a magnetic detection apparatus illustrative of an embodiment of the present invention, respectively.
Figure 1B:
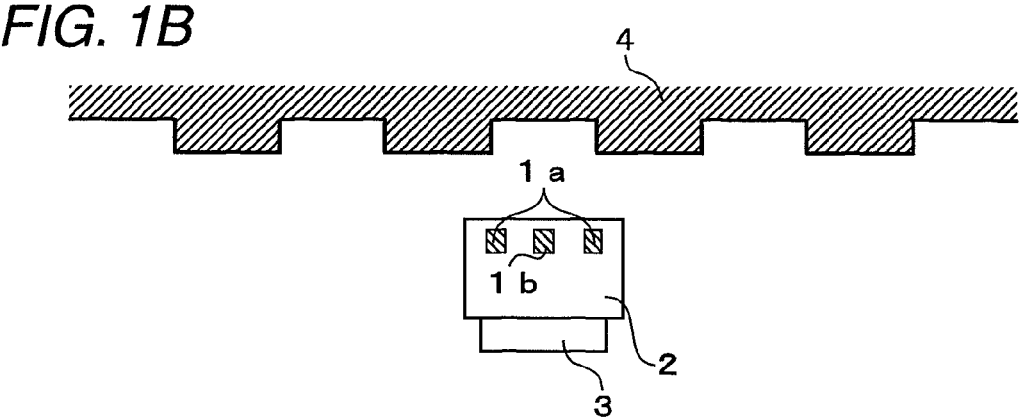

FIGS. 1A and 1B are configurational views showing a magnetic detection apparatus illustrative of an embodiment of the present invention, in which FIG. 1A is a perspective view, and FIG. 1B is a front view. A magnet 3 which generates a bias magnetic field is arranged on the lower surface of a signal processing circuit chip 2 which is configured monolithically with magnetoelectric transducers 1a and 1b. This assembly is held proximate to a magnetic moving object 4 in opposition thereto. The magnetoelectric transducers 1a and 1b detect a magnetic field distribution which the magnetic field generated by the magnet 3 forms owing to the proximity of the magnetic moving object 4 and the movement thereof, and they output the magnetic field distribution as electric resistances and the changes thereof.

Figure 2:
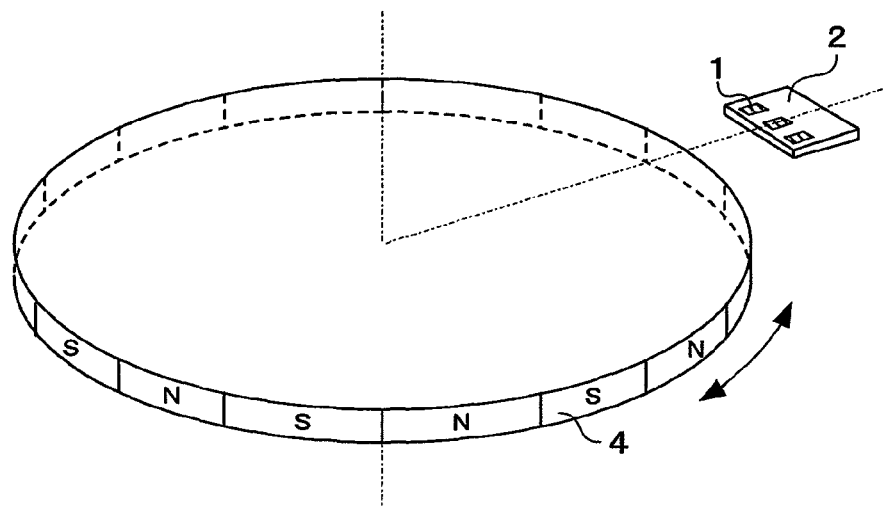
FIG. 2 is a configurational view showing a magnetic detection apparatus illustrative of another embodiment of the invention.

The magnetoelectric transducers 1a and 1b need to generate the electric resistance changes exhibiting a time shift, namely, a phase difference with the movement, in order to detect the moving direction of the magnetic moving object 4, and they are juxtaposed in the moving direction of the magnetic moving object 4 by way of example. The magnetic circuit of the invention may have a configuration in which the magnetoelectric transducers 1a and 1b can detect the magnetic field distribution formed by the proximity and movement of the magnetic moving object 4. As shown in FIG. 2, the magnetic moving object 4 may well be an aggregate of magnets which are arranged at a certain pitch. In this case, the magnet 3 can also be omitted.

Figure 3:
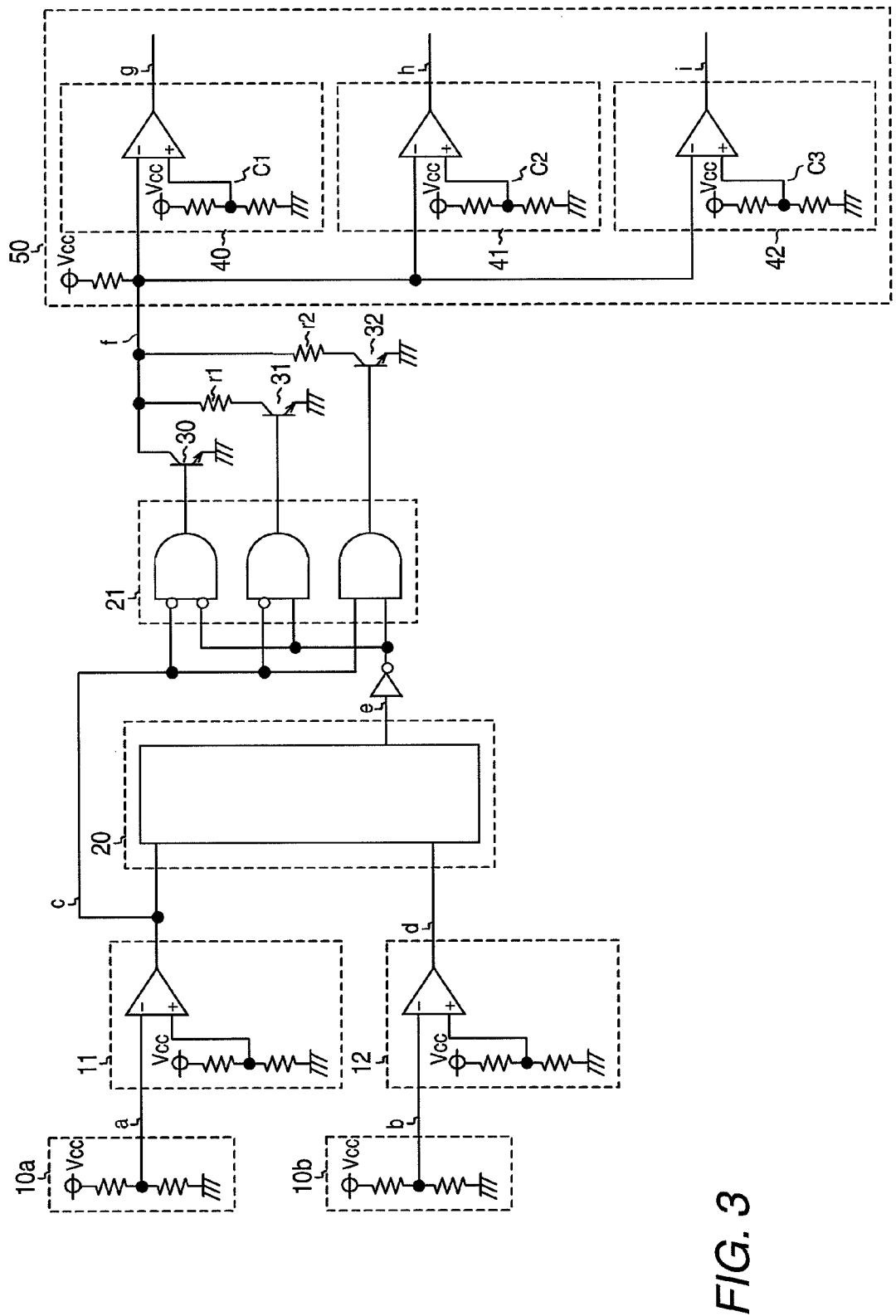
FIG. 3 is a circuit diagram showing the signal processing circuit of the magnetic detection apparatus according to Embodiment 1 of the invention.

FIG. 3 shows the signal processing circuit of Embodiment 1. The magnetoelectric transducers 1a and 1b form bridge circuits 10a and 10b, respectively. When the electric resistances of the magnetoelectric transducers 1a and 1b are changed by the movement of the magnetic moving object 4, bridge signals a and b are obtained as voltage changes, respectively. The bridge signals a and b are respectively converted into signals c and d of rectangular waves by comparator circuits 11 and 12. The rectangular wave signals c and d are inputted to a circuit 20 which is configured of delay flip-flop (D-FF) circuits and a logic circuit, whereby a moving direction signal e is obtained. The moving direction signal e is inputted to a logic circuit 21 together with the rectangular wave signal c. The three outputs of the logic circuit 21 are respectively connected to the base terminals of output transistors 30, 31 and 32.

The emitter terminals of the output transistors 30, 31 and 32 are grounded, and the collector terminals of the output transistors 31 and 32 form a sensor output signal f through respective resistors r1 and r2, likewise to the collector terminal of the output transistor 30. The sensor output signal f is transferred to a computer unit 50, and is pulled-up to a supply voltage Vcc. The sensor output signal f is inputted to the three comparator circuits 40, 41 and 42 of the computer unit 50. The sensor output signal f is compared with a comparison threshold value signal C1 in the first comparator circuit 40, thereby to obtain a comparator circuit output signal g, it is compared with a comparison threshold value signal C2 in the second comparator circuit 41, thereby to obtain a comparator circuit output signal h, and it is compared with a comparison threshold value signal C3 in the third comparator circuit 42, thereby to obtain a comparator circuit output signal i.

Figure 4:
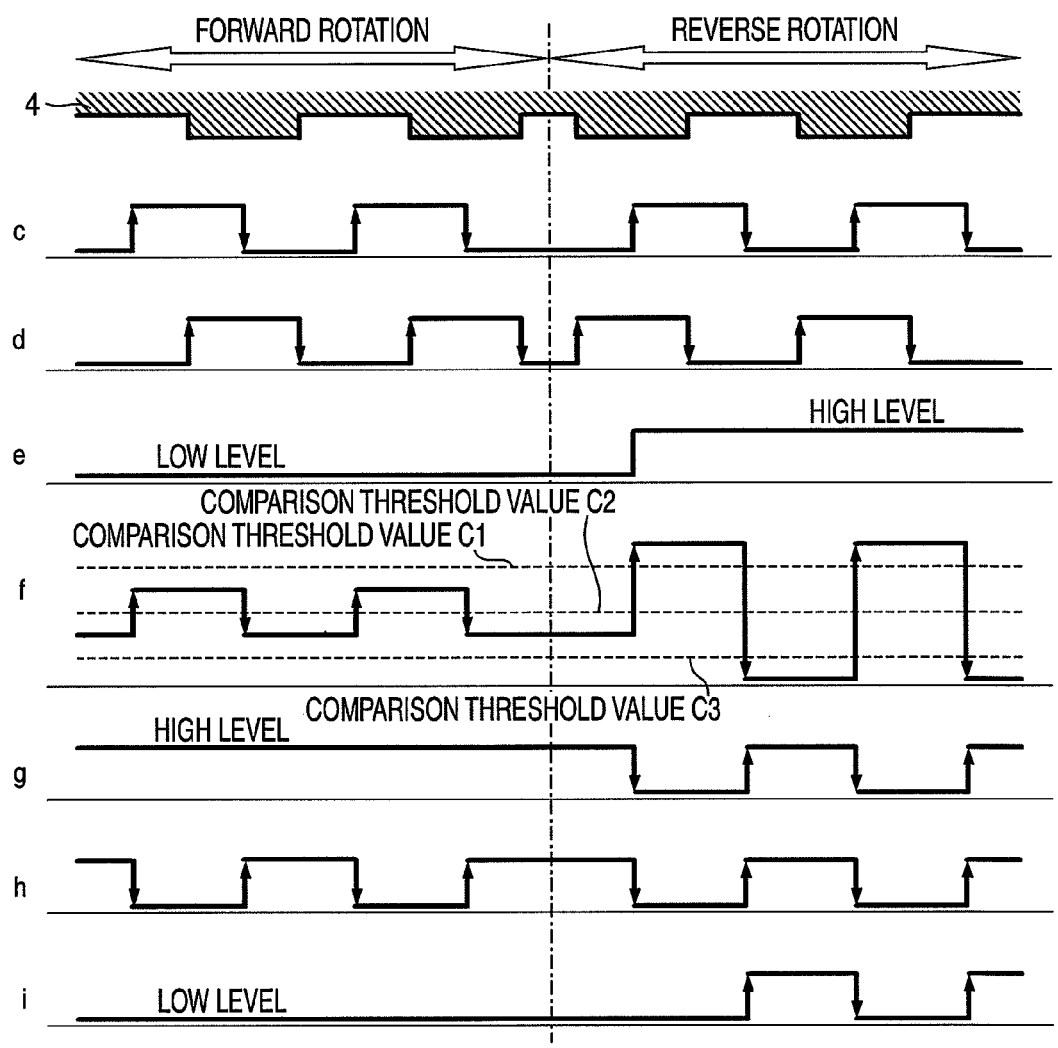
FIG. 4 is an operating waveform diagram of the signal processing circuit shown in FIG. 3.

FIG. 4 shows the operating waveforms of the signal processing circuit of the magnetic detection sensor. The figure shows the signals c, d, e and f of the respective portions of the signal processing circuit, and the three comparator circuit output signals g, h and i of the computer unit 50 (only the rectangular wave signals are shown, and the bridge signals a and b are omitted), and the waveforms correspond to a case where the moving direction of the magnetic moving object 4 has changed-over from a forward direction to a reverse direction. The rectangular wave signals c and d obtained by converting the bridge signals a and b have a phase difference therebetween, and their combination differs depending upon the moving direction of the magnetic moving object 4. Therefore, the moving direction signal e becomes a low level when the moving direction is the forward direction, and it becomes a high level when the moving direction is the reverse direction. The moving direction signal e is inputted to and processed by the logic circuit 21 together with the rectangular wave signal c, and the sensor output signal f being the output of the logic circuit 21 is subjected to a potential modulation corresponding to the moving direction, in synchronism with the rectangular wave signal c. In this case, a potential is higher in the reverse direction than in the forward direction.

The sensor output signal f is transferred to the computer unit 50, and this computer unit 50 detects the sensor output signal in accordance with the comparison threshold values of three levels (three comparator circuits 40, 41 and 42). When the moving direction of the magnetic moving object 4 is the forward direction, the output signal g of the first comparator circuit 40 is at the high level, the output signal i of the third comparator circuit 42 is at the low level, and the output signal h of the second comparator circuit 41 is a rectangular wave signal which is synchronized with the rectangular wave signal c, in other words, which corresponds to the recesses and protrusions of the magnetic moving object 4. On the other hand, when the moving direction is the reverse direction, any of the three comparator circuit output signals g, h and i is a rectangular wave signal which corresponds to the recesses and protrusions of the magnetic moving object 4. In this manner, the moving direction of the magnetic moving object 4 can be decided from the three comparator circuit output signals g, h and i of the computer unit 50.

Figure 5:
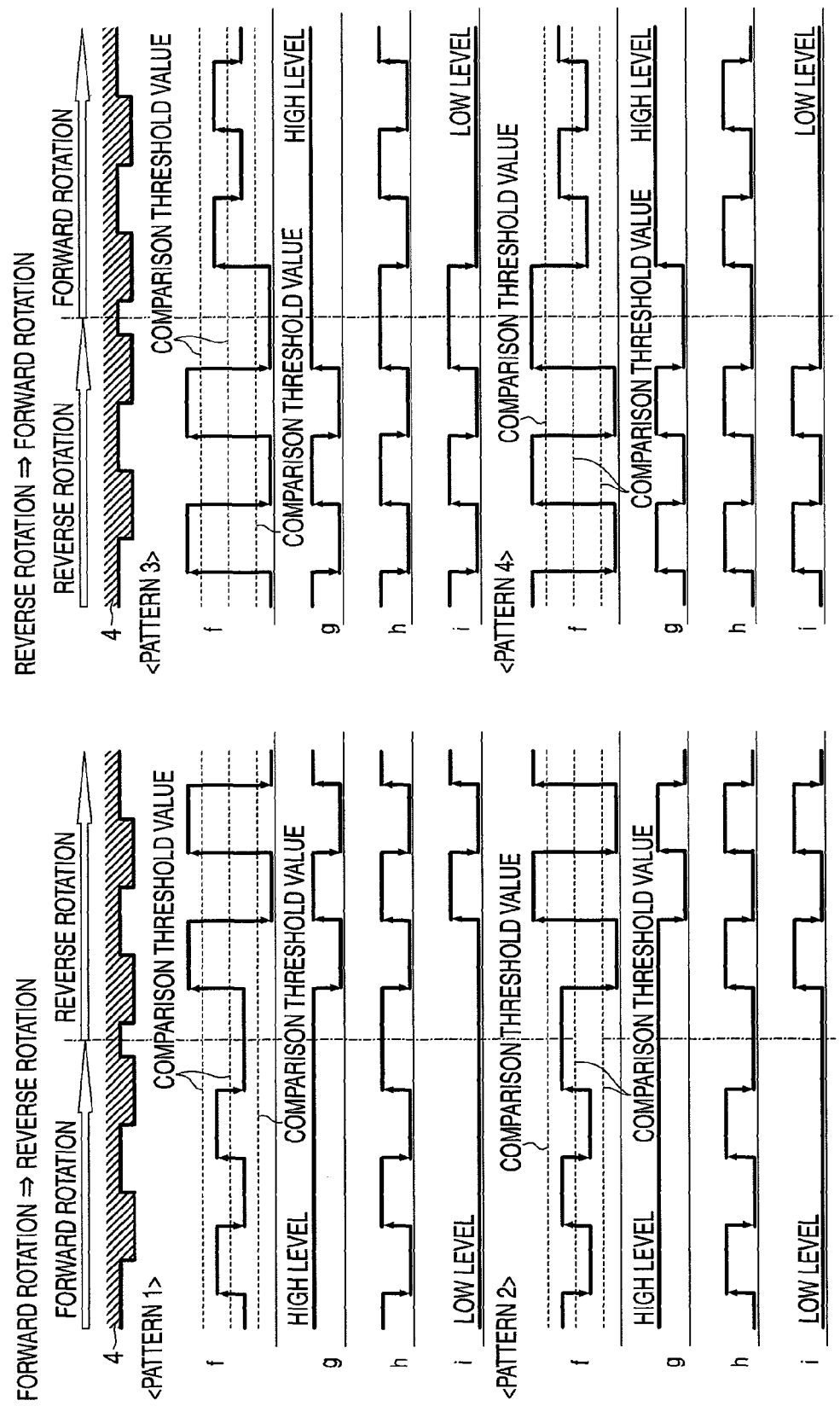
FIG. 5 is an operating waveform diagram showing all the waveforms of the moving direction detections of the magnetic detection apparatus according to Embodiment 1 of the invention.

While the waveforms in FIG. 4 correspond to the case where the moving direction of the magnetic moving object 4 has changed-over from the forward direction to the reverse direction, FIG. 5 shows all the waveforms of the moving direction detections in the sensor output signal f and the comparator circuit output signals g, h and i in Embodiment 1. Pattern 1 and Pattern 2, and Pattern 3 and Pattern 4 illustrate cases where the respective waveforms have been inverted. In all the patterns, the sensor output signal f changes in potential at its rise or fall immediately after the change-over of the moving direction, and the comparator circuit output signals g, h and i change in the combination of the three signal waveforms immediately after the change-over of the moving direction. In this manner, the invention does not cause a detection delay in any case in the detections of the moving direction of the magnetic moving object, and it permits accurate detections.

Embodiment 2

Figure 6:
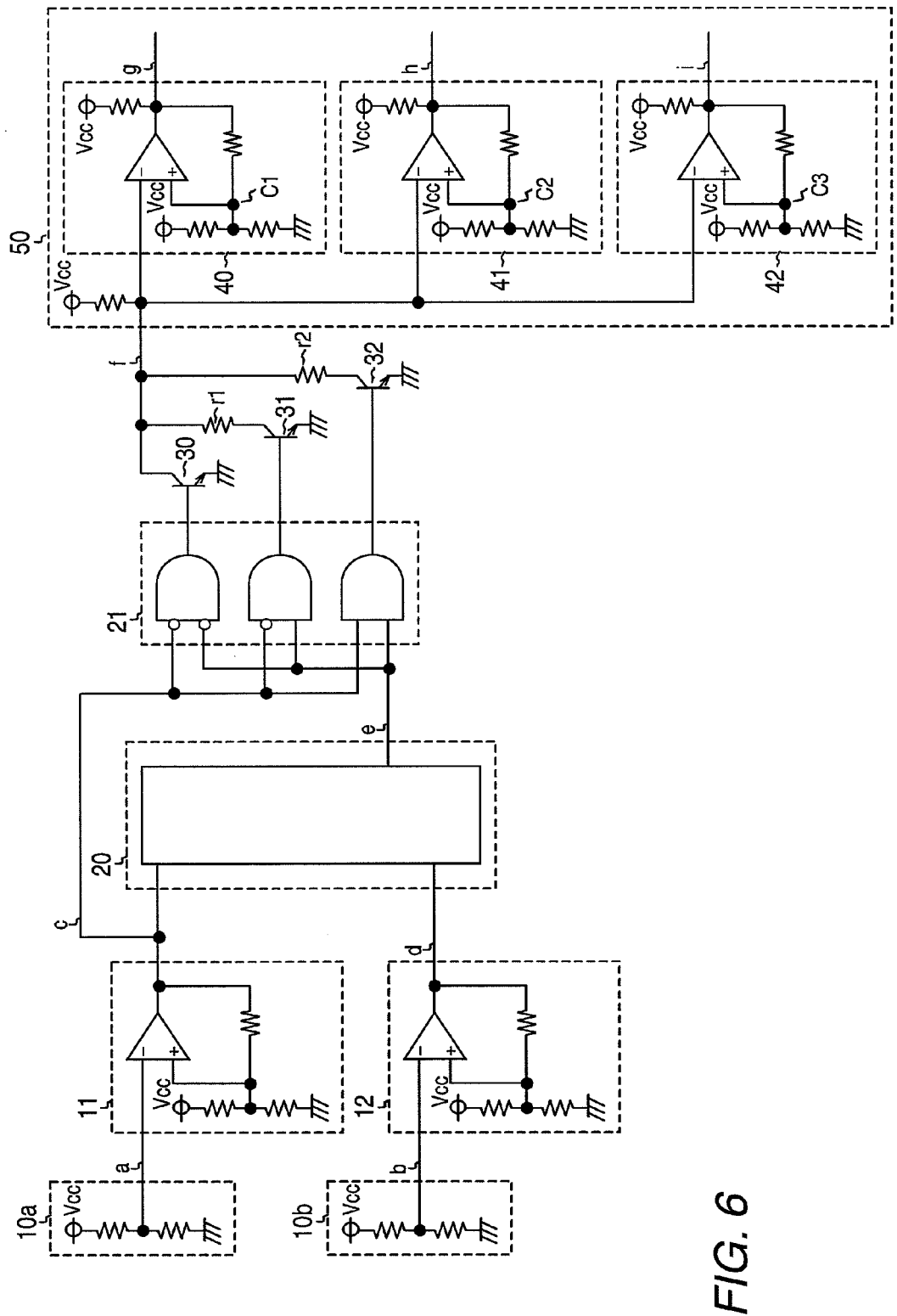
FIG. 6 is a circuit diagram showing the signal processing circuit of a magnetic detection apparatus according to Embodiment 2 of the invention.

FIG. 6 shows a signal processing circuit in Embodiment 2. In the same manner as in Embodiment 1, the signal processing circuit is configured of bridge circuits 10a and 10b, comparator circuits 11 and 12, a circuit 20 which is configured of D-FF circuits and a logic circuit, a logic circuit 21, output transistors 30, 31 and 32, and comparator circuits 40, 41 and 42, and bridge signals a and b, rectangular wave signals c and d, a rotating direction signal e, a sensor output signal f, and comparator circuit output signals g, h and i are generated from the respective circuits. An inverter before the input of the logic circuit 21 is not provided, and the rotating direction signal e has a phase opposite to that of the moving direction signal e in Embodiment 1. Accordingly, Embodiment 2 differs from Embodiment 1 in the potential of the sensor output signal f corresponding to the moving direction, and in the waveforms of the comparison output signals g, h and i corresponding to the moving direction.

Figure 7A:
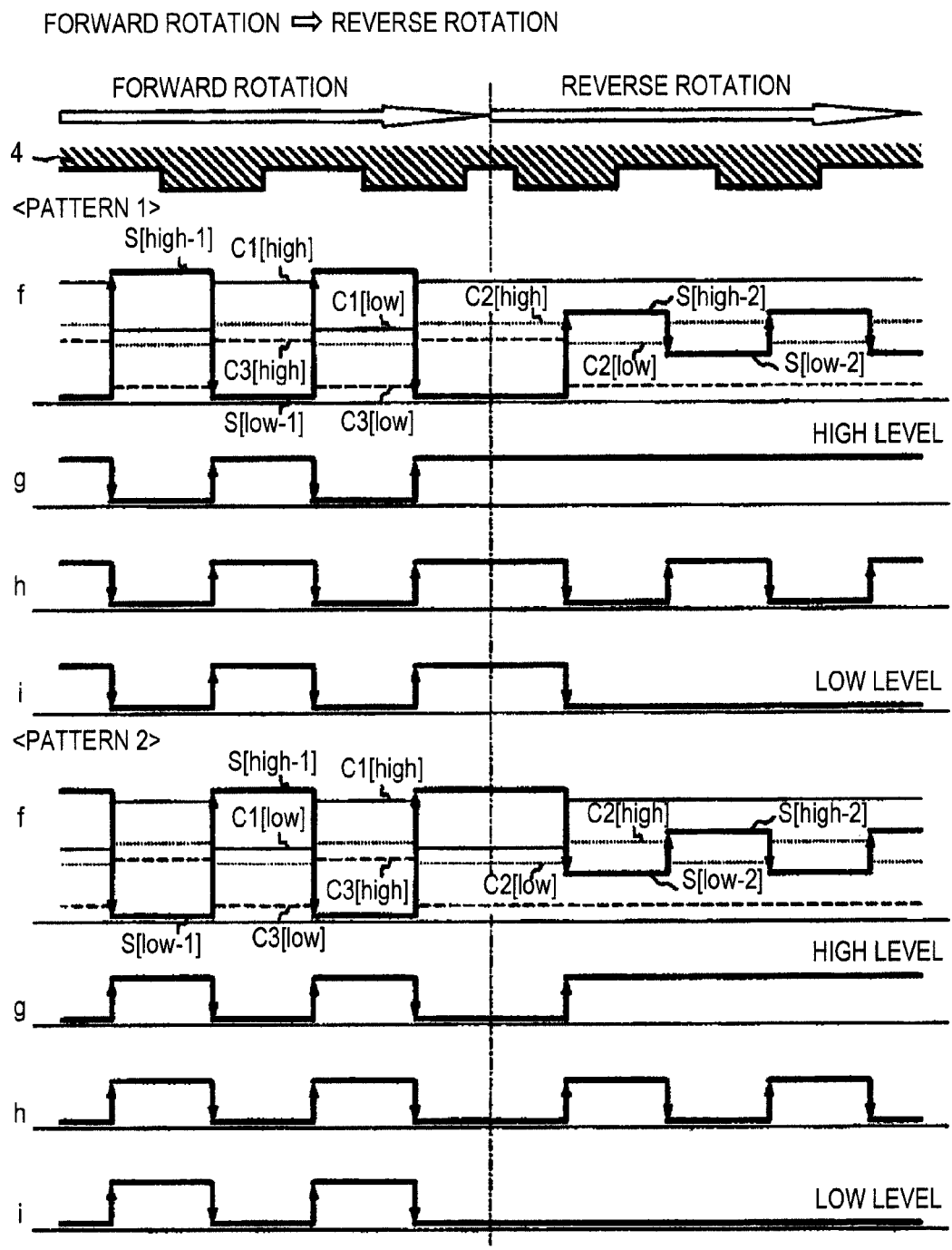
FIGS. 7A and 7B is an operating waveform diagram showing all the waveforms of the moving direction detections of the magnetic detection apparatus according to Embodiment 2 of the invention.
Figure 7B:
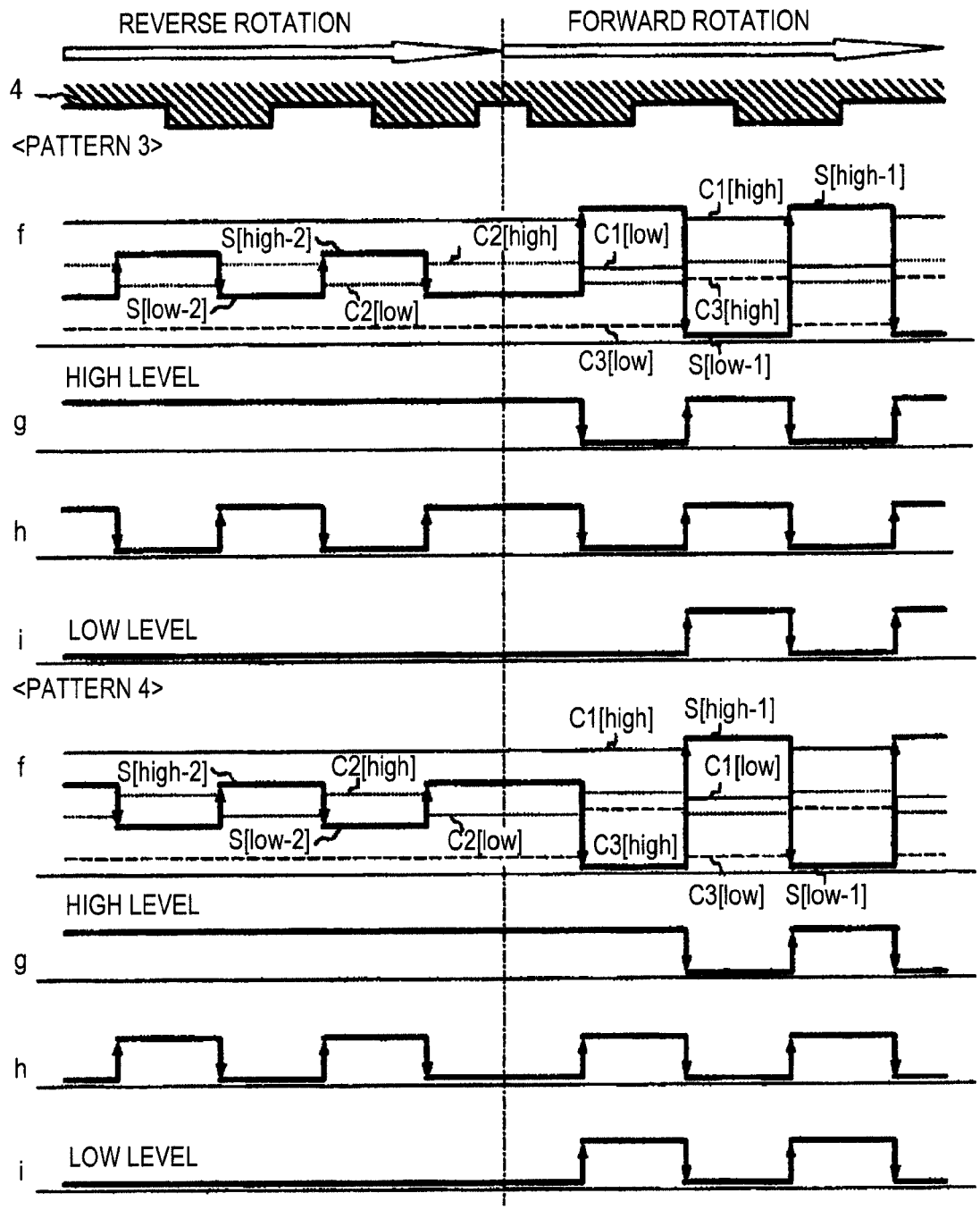

FIGS. 7A and 7B shows all the waveforms of the moving direction detections in the sensor output signal f and the comparator circuit output signals g, h and i in Embodiment 2. In all patterns, the sensor output signal f changes in potential at its rise or fall immediately after the change-over of the moving direction, and the comparator circuit output signals g, h and i change in the combination of the three signal waveforms immediately after the change-over of the moving direction. It is understood that, also in Embodiment 2, a detection delay is not caused in any case in the detections of the moving direction of the magnetic moving object, in the same manner as in Embodiment 1, so accurate detections are possible.

Besides, in FIGS. 7A and 7B, the comparison threshold value signals C1, C2 and C3 of the comparator circuits of a computer unit 50 are shown together with the sensor output signal f, inclusive of the hystereses of the comparison threshold value signals. When the moving direction is the forward direction, the hystereses of each comparison threshold value signal cross each other, but the high level S[high-1] and low level S[low-1] of the sensor output signal f become the maximum and minimum of an output potential range. Accordingly, each comparison threshold value signal can assume any desired potential within a range in which the potential variance components of the high level S[high-1] and low level S[low-1] are subtracted from the output potential range, inclusive of the hystereses of the comparison threshold value signal.

On the other hand, when the moving direction is the reverse direction, it is necessary that the output signal g of the first comparator circuit 40 is at the high level, that the output signal i of the third comparator circuit 42 is at the low level, and that the output signal h of the second comparator circuit 41 is a rectangular wave signal which is synchronized with the rectangular wave signal c, in other words, which corresponds to the recesses and protrusions of the magnetic moving object. Therefore, regarding the high level S[high-2] (<S[high-1]) and low level S[low-2] (>S[low-1]) of the sensor output signal f, each comparison threshold value signal has conditions imposed on setting, inclusive of the hystereses thereof.

In the comparison threshold value signals C1, C2 and C3, the high potential sides of the hystereses of these comparison threshold value signals are respectively denoted by C1[high], C2[high] and C3[high], and the low potential sides are respectively denoted by C1[low], C2[low] and C3[low]. Then, the accurate detection of the moving direction of the magnetic moving object can be performed by satisfying the following:

S[high-1]>C1[high]>S[high-2]

C1[high]>C1[low]>S[low-2]

S[high-2]>C2[high]>C2[low]>S[low-2]

S[high-2]>C3[high]>C3[low]

S[low-2]>C3[low]>S[low-1]

Further, the hystereses of the comparison threshold value signals C1, C2 and C3 can be set large by holding the following:

S[high-1]>C1[high]>S[high-2]>C1[low]>S[low-2]

S[high-2]>C2[high]>C2[low]>S[low-2]

S[high-2]>C3[high]>S[low-2]>C3[low]>S[low-1]

In this manner, in the potential modulation of the sensor output signal based on the moving direction of the magnetic moving object, the signals at the time when the moving direction is the forward direction become the maximum and minimum of the output potential range. Therefore, the forward moving direction corresponds to a wide range of detection conditions (such as signal frequencies), and there is an allowance degree at which the hystereses of the comparison threshold value signals in the comparator circuits of the computer unit can be enlarged, so that a high noise immunity can be realized.

Embodiment 3

This embodiment consists in that the hystereses of the comparison threshold value signals at the time of the forward moving direction of the magnetic moving object as indicated in Embodiment 2 is set large to the utmost. In the comparison threshold value signals C1, C2 and C3, the high potential sides of the hystereses of these comparison threshold value signals are respectively denoted by C1[high], C2[high] and C3[high], and the low potential sides are respectively denoted by C1[low], C2[low] and C3[low]. Then, the hystereses of the comparison threshold value signals C1, C2 and C3 are set larger by holding the following:

S[high-1]>C1[high]>S[high-2]>C3[high]>C1[low]> S[low-2]>C3[low]>S[low-1]

S[high-2]>C2[high]>C2[low]>S[low-2]

Figure 8A:
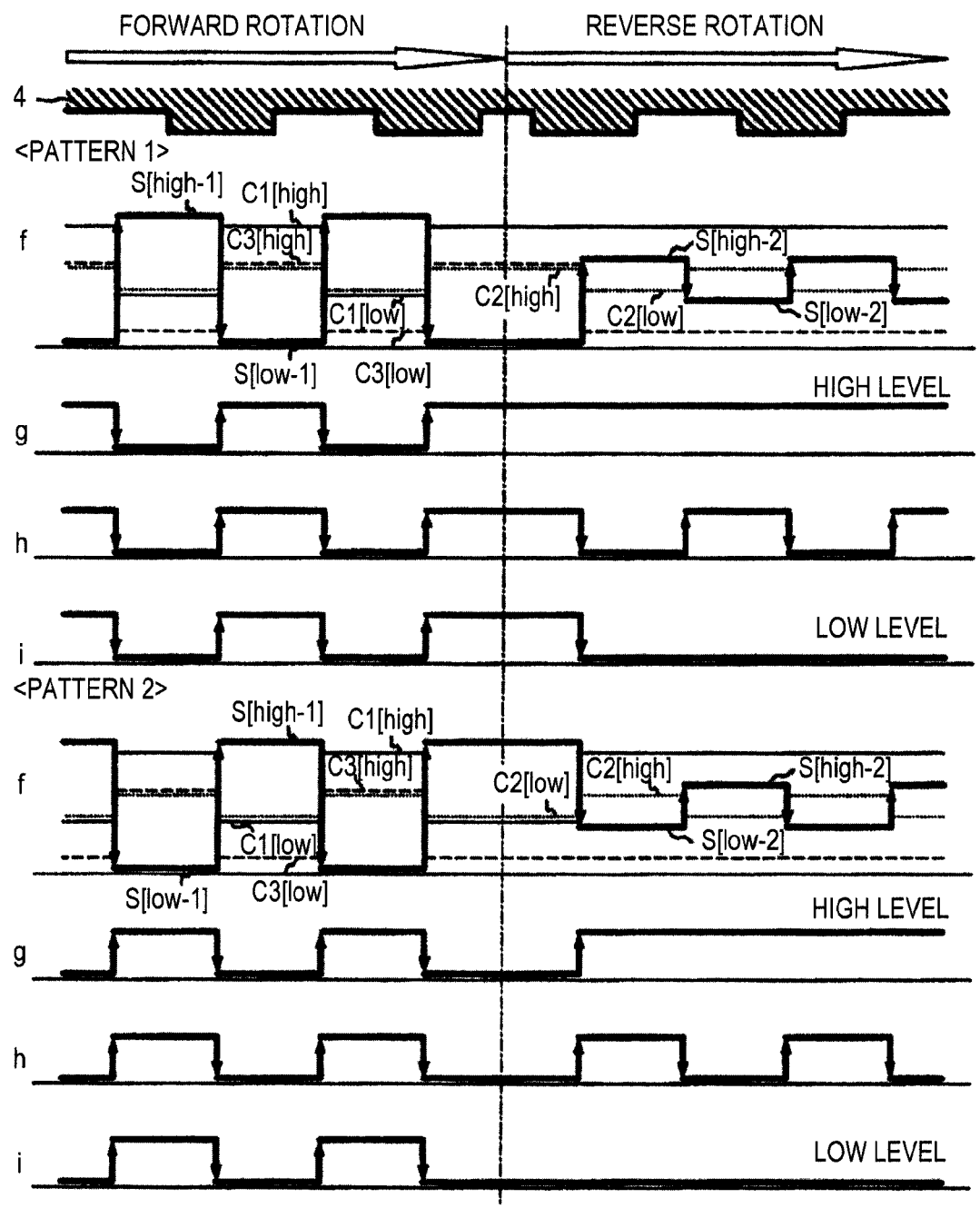
FIGS. 8A and 8B is an operating waveform diagram showing all the waveforms of the moving direction detections of a magnetic detection apparatus according to Embodiment 3 of the invention.
Figure 8B:
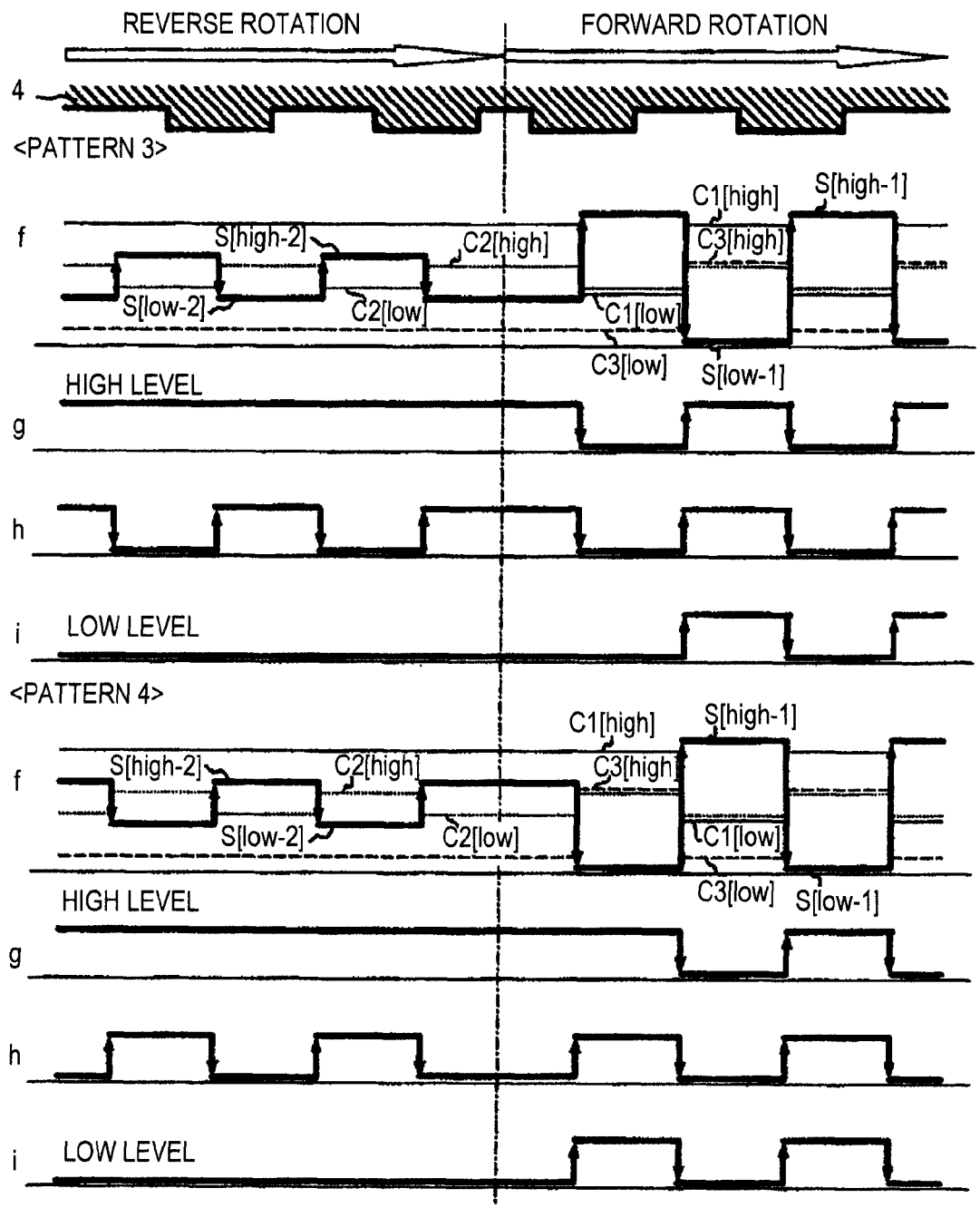

FIGS. 8A and 8B shows all the waveforms of the moving direction detections in the sensor output signal f and the comparator circuit output signals g, h and i in Embodiment 3. In the figure, the hystereses of the comparison threshold value signals C1, C2 and C3 shown together with the sensor output signal f are still larger than in Embodiment 2.

Embodiment 4

Figure 9:
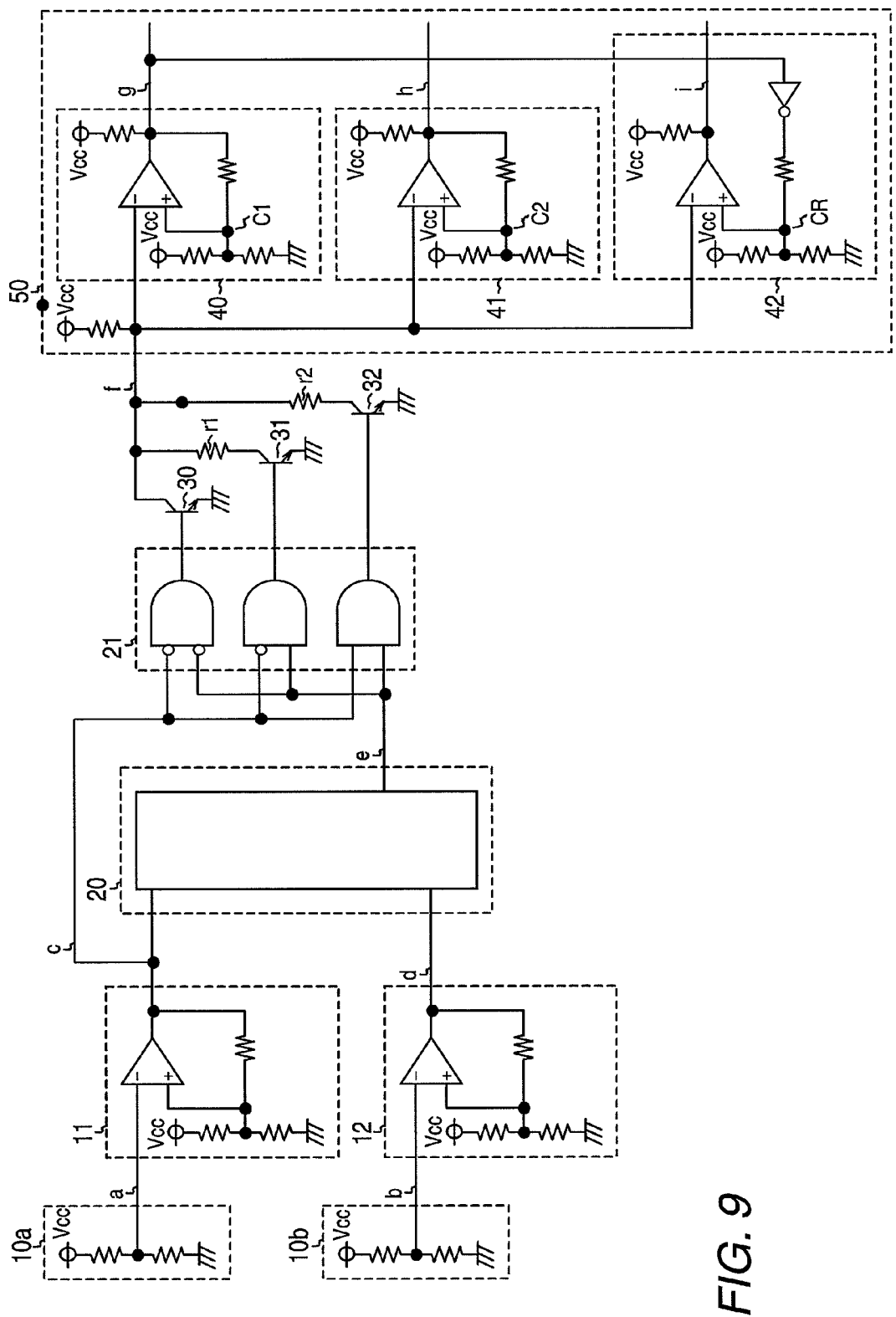
FIG. 9 is a circuit diagram showing the signal processing circuit of a magnetic detection apparatus according to Embodiment 4 of the invention.

FIG. 9 shows a signal processing circuit in Embodiment 4. In the same manner as in each of the foregoing embodiments, the signal processing circuit is configured of bridge circuits 10a and 10b, comparator circuits 11 and 12, a circuit 20 which is configured of D-FF circuits and a logic circuit, a logic circuit 21, output transistors 30, 31 and 32, and comparator circuits 40, 41 and 42, and bridge signals a and b, rectangular wave signals c and d, a rotating direction signal e, a sensor output signal f, and comparator circuit output signals g, h and i are generated from the respective circuits. The signal processing output of a magnetic detection sensor is the same as in Embodiment 2.

The configurations of the comparator circuits to which the sensor output signal f is inputted differ from those in each of the foregoing embodiments. In the first comparator circuit 40, the sensor output signal f is compared with a comparison threshold value signal C1 to obtain the comparator circuit output signal g, and in the second comparator circuit 41, the sensor output signal f is compared with a comparison threshold value signal C2 to obtain the comparator circuit output signal h. In the third comparator circuit 42, however, the sensor output signal f is compared with a comparison threshold value signal CR to obtain the comparator circuit output signal i. The comparison threshold value signal CR is a signal obtained by inverting the output signal of the first comparator circuit 41.

Figure 10A:
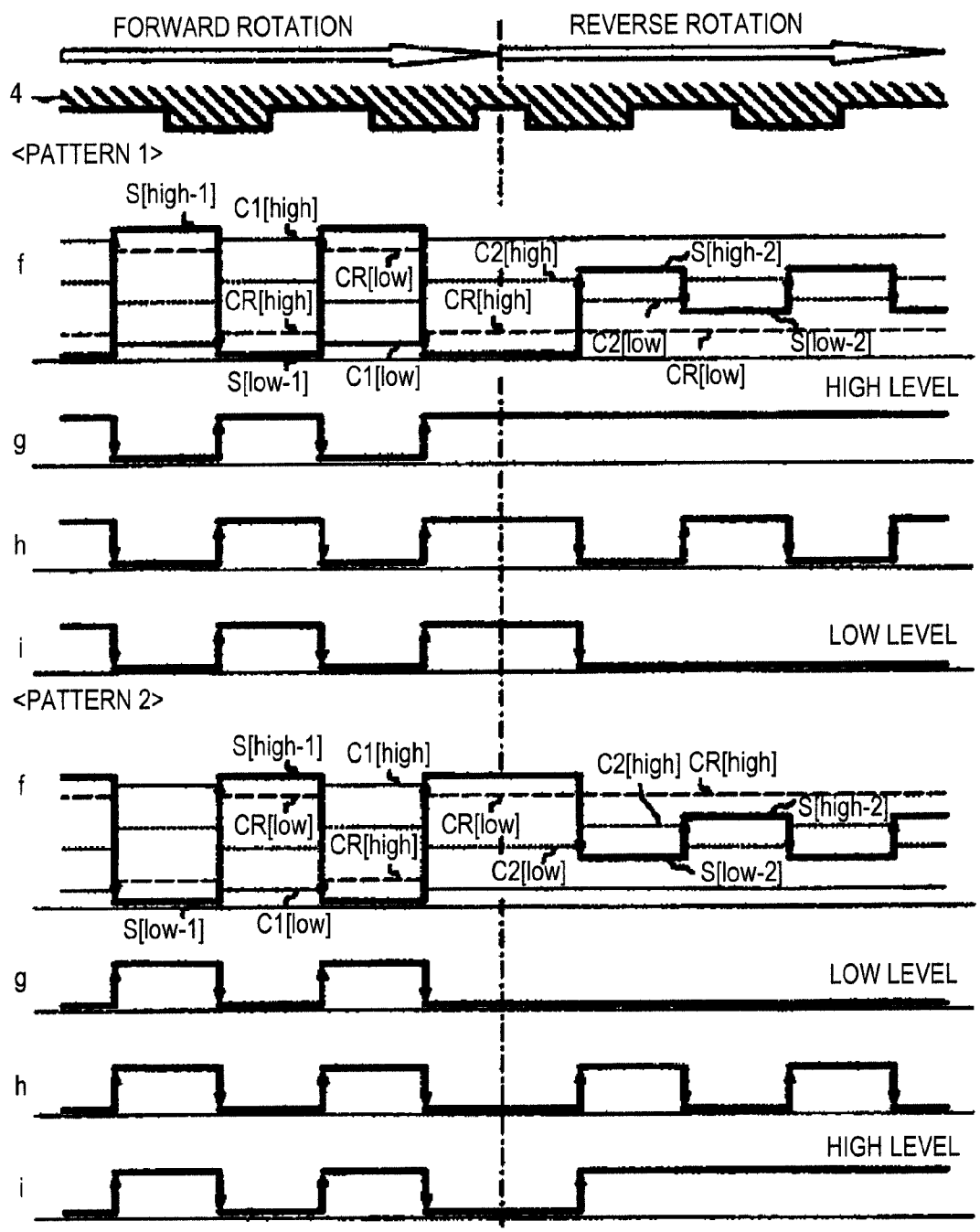
FIGS. 10A-10C is an operating waveform diagram showing all the waveforms of the moving direction detections of the magnetic detection apparatus according to Embodiment 4 of the invention.
Figure 10B:
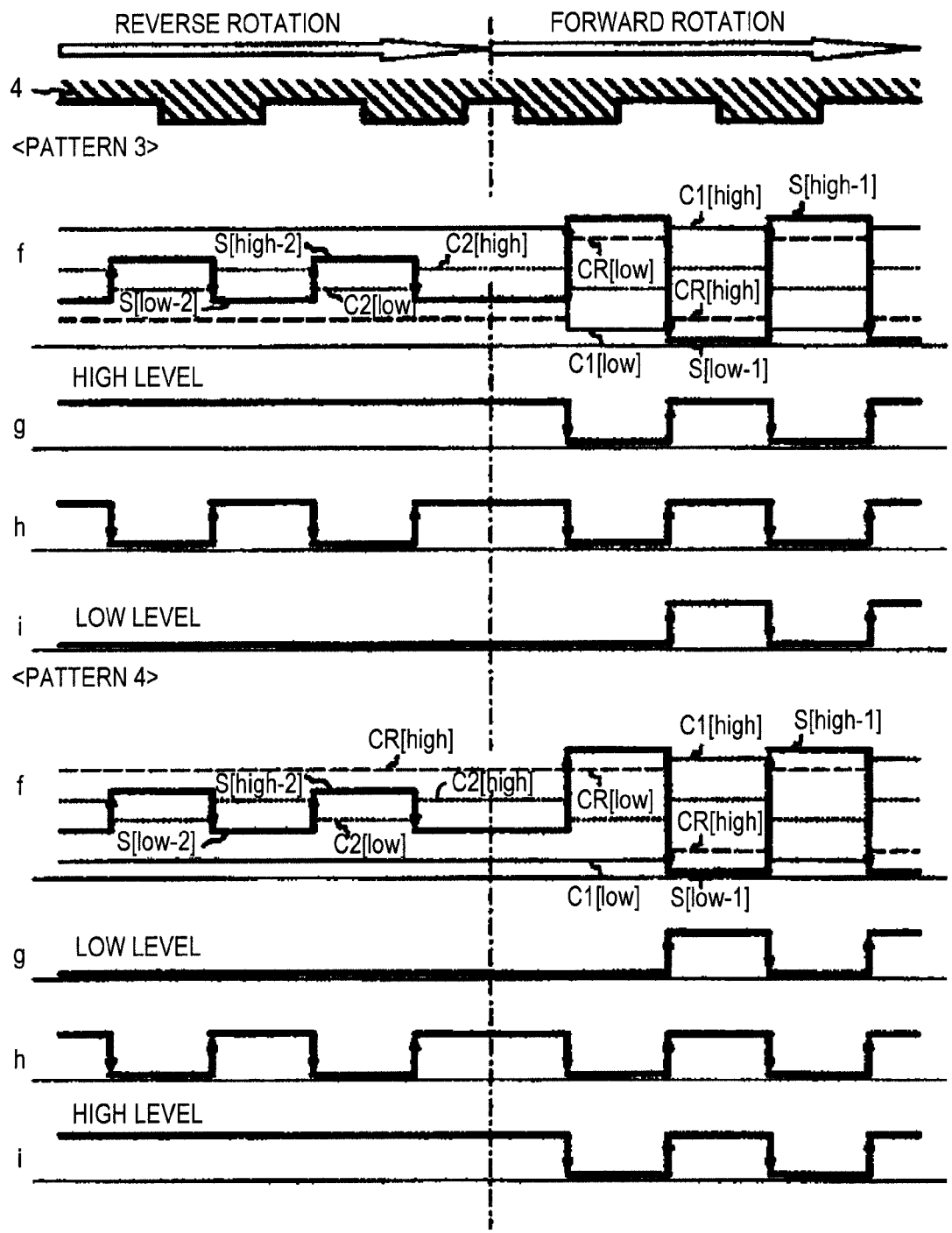
Figure 10C:
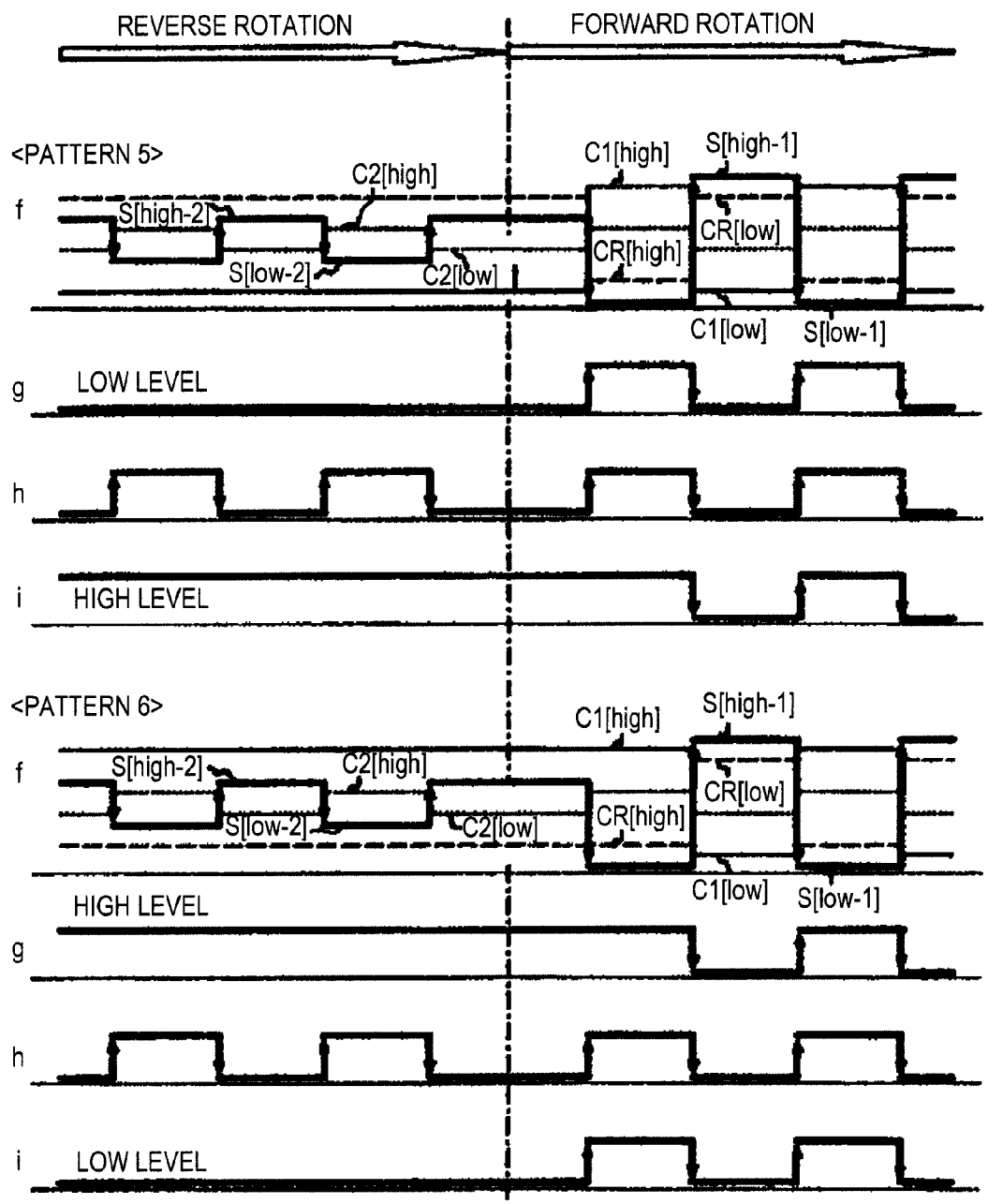

FIGS. 10A-10C shows all the waveforms of moving direction detections in the sensor output signal f and the comparator circuit output signals g, h and i in Embodiment 4. In all patterns, the sensor output signal f changes in potential at its rise or fall immediately after the change-over of the moving direction, and the comparator circuit output signals g, h and i change in the combination of the three signal waveforms immediately after the change-over of the moving direction. It is understood that, also in Embodiment 4, a detection delay is not caused in any case in the detections of the moving direction of a magnetic moving object, in the same manner as in each of the foregoing embodiments, so accurate detections are possible.

Besides, in FIGS. 10A-10C, the comparison threshold value signals C1, C2 and CR of the respective comparator circuits 40, 41 and 42 of a computer unit 50 are shown together with the sensor output signal f, inclusive of the hystereses of the comparison threshold value signals. When the moving direction is a forward direction, the high level S[high-1] and low level S[low-1] of the sensor output signal f become the maximum and minimum of an output potential range. Accordingly, each comparison threshold value signal can assume any desired potential within a range in which the potential variance components of the high level S[high-1] and low level S[low-1] are subtracted from the output potential range, inclusive of the hystereses of the comparison threshold value signal. Therefore, the hysteresis of the comparison threshold value signal C1 is set large to the utmost for the purpose of a noise immunity.

On the other hand, when the moving direction is a reverse direction, it is necessary that the comparator circuit output signal h is a rectangular wave signal which is synchronized with the rectangular wave signal c, in other words, which corresponds to the recesses and protrusions of the magnetic moving object. Therefore, regarding the high level S[high-2] (<S[high-1]) and low level S[low-2] (>S[low-1]) of the sensor output signal f, the comparison threshold value signal C2 has conditions imposed on setting, inclusive of the hysteresis thereof. That is, the conditions are imposed on only the comparison threshold value signal C2 of the second comparator circuit 41. The comparison threshold value signal C1 of the first comparator circuit 40 is not especially subjected to conditions in the direction of enlarging the hysteresis thereof, and is endowed with a high versatility of setting.

The high potential sides of the hystereses of the comparison threshold value signals C1 and C2 are respectively denoted by C1[high] and C2[high], and the low potential sides are respectively denoted by C1[low] and C2[low]. Then, the following is satisfied:

S[high-1]>C1[high]>S[high-2]>S[low-2]>C1[low]> S[low-1]

S[high-2]>C2[high]>C2[low]>S[low-2]

In this case, it is further necessary that the comparator circuit output signals g and h at the time when the moving direction is the reverse direction are in a mutual complementary relation so as to prevent the detection delay of the moving direction. The comparison threshold value signal CR of the third comparator circuit 42 is set as the inverted signal of the output signal g of the first comparator circuit 40 for this purpose.

The comparison threshold value signal CR is not a signal in which a fixed potential has a hysteresis, but it is a signal in which a potential with an amplitude (the opposite phase of the comparator circuit output signal g) has a hysteresis. According to this embodiment, the setting of the comparison threshold value signal C1 of the first comparator circuit 40, inclusive of the hysteresis of this signal C1, does not differ in conditions from setting in a magnetic detection apparatus in which the potential modulation of a sensor output signal is nonexistent. Accordingly, this embodiment is interchangeable with the related-art apparatus which does not detect the moving direction of a magnetic moving object, and it can be utilized by a method having actual results.

In performing the invention, the selections of the constituents and configuration of the magnetic detection apparatus are not especially restricted. By way of example, the magnetoelectric transducer may be an element which detects a magnetic field intensity, such as Hall element, magnetoresistive (MR) element, giant magnetoresistive (GMR) element, or tunneling magnetoresistive (TMR) element, and the number and arrangement of the elements can be selected at will as long as the movement position and moving direction of the magnetic moving object can be detected (for example, two magnetic detection sensors may well be employed). Besides, the signal processing circuit may be constituted by bipolar transistors, MOS (Metal-Oxide Semiconductor) transistors, or the likes.

COMPARATIVE EXAMPLE

An example to be compared with each of the embodiments will be described below.

Figure 11:
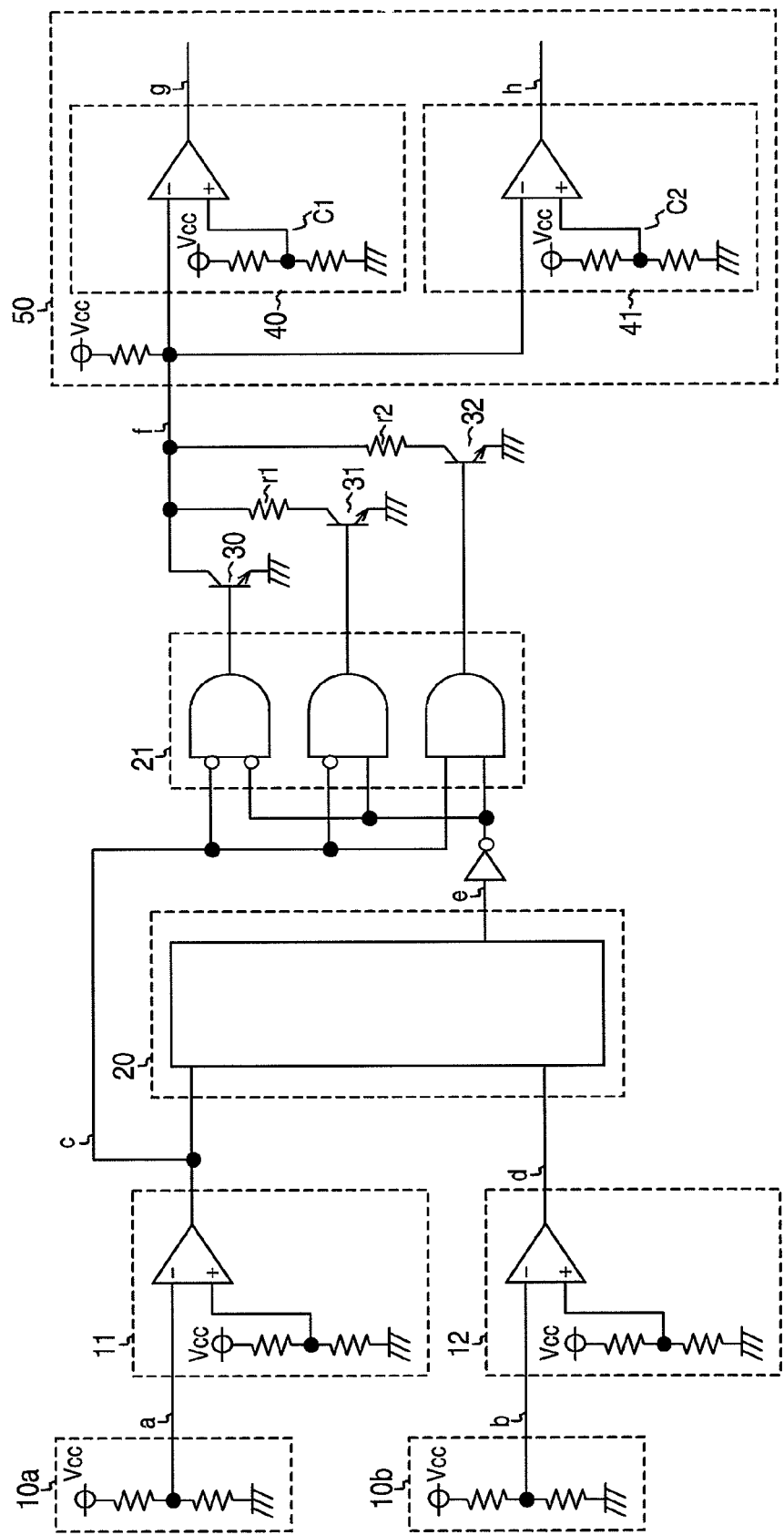
FIG. 11 is a circuit diagram showing the signal processing circuit of a comparative example of a magnetic detection apparatus according to the invention.

A magnetic detection apparatus in this comparative example has a configuration in which the number of the comparator circuits in the computer unit 50 in Embodiment 1 is made two. FIG. 11 shows a signal processing circuit in this comparative example. In the first comparator circuit 40, the sensor output signal f is compared with the comparison threshold value signal C1 to obtain the comparator circuit output signal g, and in the second comparator circuit 41, the sensor output signal f is compared with the comparison threshold value signal C2 to obtain the comparator circuit output signal h.

Figure 12:
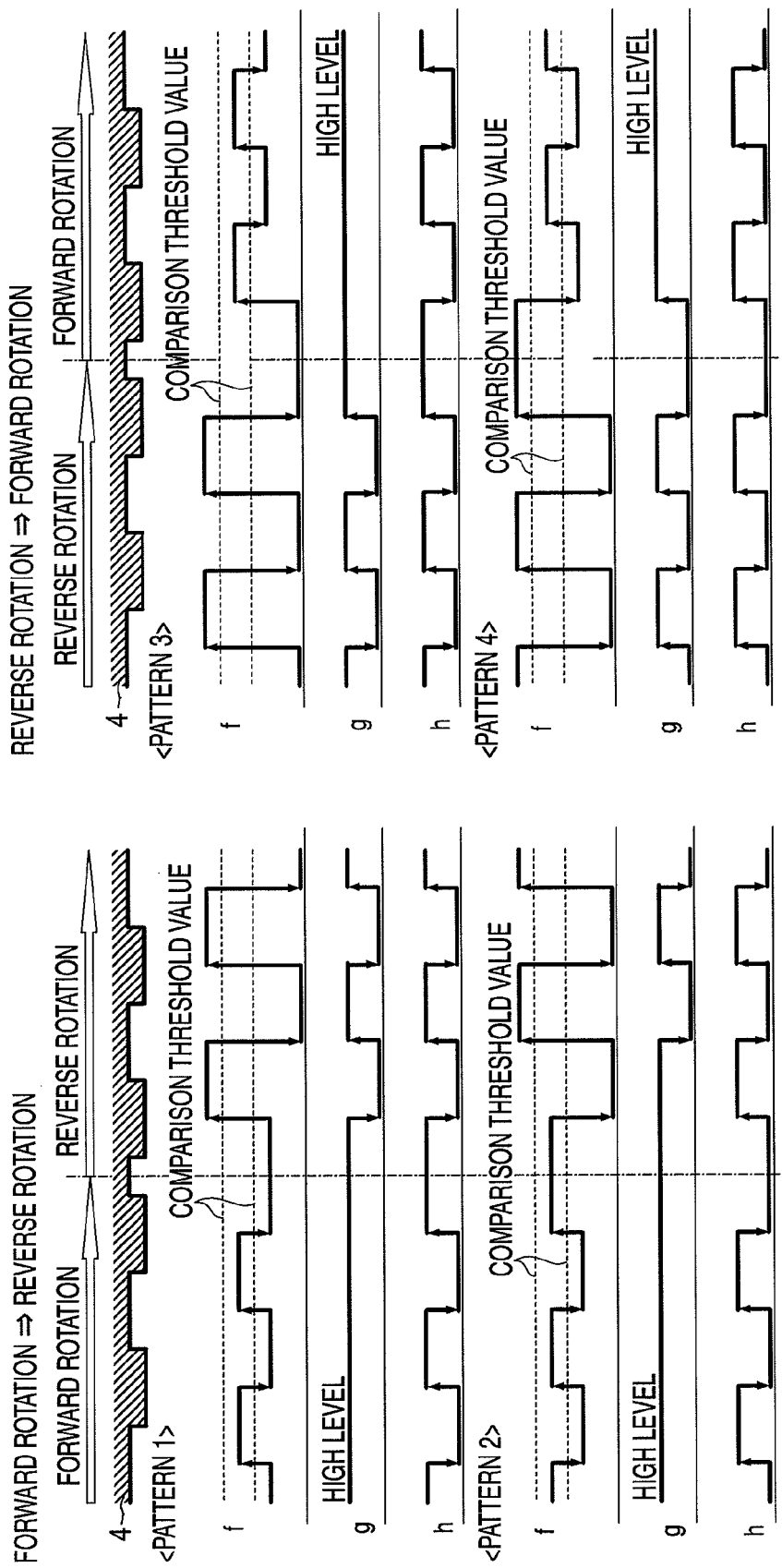
FIG. 12 is an operating waveform diagram showing all the waveforms of the moving direction detections of the comparative example of the magnetic detection apparatus according to the invention.

FIG. 12 shows all the waveforms of moving direction detections in the sensor output signal f and the comparator circuit output signals g and h in this comparative example. In all patterns, the sensor output signal f changes in potential at its rise or fall immediately after the change-over of the moving direction. On the other hand, the comparator circuit output signals g and h are in a pattern in which the combination of the two signal waveforms changes delaying from a time immediately after the change-over of the moving direction. In this comparative example, a detection delay is sometimes caused in the detection of the moving direction of the magnetic moving object, and the accurate detection as in each of the embodiments of the invention is not realized.

Besides, in the field of use where the mounting environment of the apparatus is inferior and where the moving direction of the magnetic moving object is mostly the forward direction, the signals especially in the operation in the forward direction correspond to a wide range of detection conditions (such as rotation numbers), and they need to have a noise immunity, a robustness for temperature changes, etc. In this regard, according to the invention, the accurate detection of the movement position of the magnetic moving object and the usability and reliability of the signals corresponding to the forward moving direction can be made compatible.

In case of an on-vehicle rotation detection apparatus which is an example of application of the invention, the information of a rotational position gives, for example, the position of the piston of an engine and is used for an ignition control. Owing to the detection of a rotating direction, the position of the piston can be accurately detected, not only during the ordinary rotation of the engine, but also in the stop operation, etc., and the ignition control is permitted in all the operations of the engine. Moreover, the rotation detection apparatus has a high reliability even under the severe environmental conditions of noise, temperatures, etc. in the engine. Therefore, the apparatus has no risk in the practical use and contributes to the realization of an engine of low fuel consumption and high efficiency.

Various modifications and alterations of the present invention will be apparent to those skilled in the art without departing from the scope and spirit of the invention, and it should be understood that the invention is not limited to the illustrative embodiments set forth herein.

What is claimed is:

1. A magnetic detection apparatus comprising:
a magnetic detection sensor which includes a magnetoelectric transducer for detecting a magnetic field intensity, and a signal processing circuit for processing an output signal of the magnetoelectric transducer so as to output a signal of rectangular wave, and which detects a movement position and a moving direction of a magnetic moving object that gives a change to a magnetic field applied to the magnetoelectric transducer; and
a computer unit which processes an output signal of said magnetic detection sensor so as to detect the movement position and moving direction of the magnetic moving object;
wherein said magnetic detection sensor generates the output signal whose high level and low level have different potentials in accordance with the moving direction of the magnetic moving object; and
said computer unit includes three comparator circuits and detects the output signal of said magnetic detection sensor with three levels of comparison threshold values.

2. A magnetic detection apparatus as defined in claim 1, wherein:
the output signal of said magnetic detection sensor based on a movement of the magnetic moving object in a forward direction becomes a maximum and a minimum of an output potential range; and
the high level S[high-1] and low level S[low-1] of the output signal of said magnetic detection sensor based on the movement of the magnetic moving object in the forward direction,
the high level S[high-2] and low level S[low-2] of the output signal of said magnetic detection sensor based on a movement of the magnetic moving object in a reverse direction, and
potentials C1[high] and C1[low], C2[high] and C2[low], and C3[high] and C3[low] of hystereses of respective comparison threshold value signals C1, C2 and C3 of the first, second and third comparator circuits, satisfy the following:

S[high-1]>C1[high]>S[high-2],

C1[high]>C1[low]>S[low-2],

S[high-2]>C2[high]>C2[low]>S[low-2],

S[high-2]>C3[high]>C3[low], and

S[low-2]>C3[low]>S[low-1].

3. A magnetic detection apparatus as defined in claim 2, wherein the potentials C1[high] and C1[low], C2[high] and C2[low], and C3[high] and C3[low] of the hystereses of the signals of the respective comparison threshold value signals C1, C2 and C3 of three levels in said computer units, satisfy the following:

$$S[high\text{-}1] > C1[high] > S[high\text{-}2] > C1[low] > S[low\text{-}2],$$

$$S[high\text{-}2] > C2[high] > C2[low] > S[low\text{-}2], \text{ and}$$

$$S[high\text{-}2] > C3[high] > S[low\text{-}2] > C3[low] > S[low\text{-}1].$$

4. A magnetic detection apparatus as defined in claim 3, wherein the potentials C1[low] and C3[high] of the hystereses of signals C1 and C3 among the comparison threshold value signals C1, C2 and C3 of the three levels in said computer unit, satisfy the following:

$$C3[high] > C1[low].$$

5. A magnetic detection apparatus as defined in claim 1, wherein:
- the output signal of said magnetic detection sensor based on a movement of the magnetic moving object in a forward direction becomes a maximum and a minimum of an output potential range;
- the high level S[high-1] and low level S[low-1] of the output signal of said magnetic detection sensor based on the movement of the magnetic moving object in the forward direction,
- the high level S[high-2] and low level S[low-2] of the output signal of said magnetic detection sensor based on a movement of the magnetic moving object in a reverse direction, and
- potentials C1[high] and C1[low], and C2[high] and C2[low] of hystereses of signals C1 and C2 among respective comparison threshold value signals C1, C2 and CR of the first, second and third comparator circuits of said computer units, satisfy the following:

$$S[high\text{-}1] > C1[high] > S[high\text{-}2] > S[low\text{-}2] > C1[low] > S[low\text{-}1], \text{ and}$$

$$S[high\text{-}2] > C2[high] > C2[low] > S[low\text{-}2]; \text{ and}$$

- the other comparison threshold value signal CR is a signal obtained by inverting an output signal of the first comparator circuit.

6. A magnetic detection apparatus as defined in claim 1, which is used especially as an on-vehicle rotation detection apparatus.

* * * * *